| United States Patent [19] | [11] | 4,165,918 |
|---|---|---|
| Moreno | [45] | Aug. 28, 1979 |

[54] THERMAL COMPENSATOR ASSEMBLY

[75] Inventor: Isabel L. Moreno, Oceanside, Calif.

[73] Assignee: Ford Aerospace & Communications Corp., Dearborn, Mich.

[21] Appl. No.: 860,345

[22] Filed: Dec. 14, 1977

[51] Int. Cl.$^2$ .............................................. G02B 7/02
[52] U.S. Cl. .................................................... 350/253
[58] Field of Search ..................... 350/252, 253, 255

[56] References Cited

U.S. PATENT DOCUMENTS

| 1,325,936 | 12/1919 | Fouasse | 350/253 |
| 2,533,478 | 12/1950 | Lee et al. | 350/253 |
| 2,537,900 | 1/1951 | Lee et al. | 350/253 |
| 3,205,774 | 9/1965 | Estes | 350/253 |
| 3,484,718 | 12/1969 | Foster | 350/253 X |
| 3,612,664 | 10/1971 | Berman | 350/253 |
| 3,671,108 | 6/1972 | Kilgus | 350/253 |

*Primary Examiner*—F. L. Evans

*Attorney, Agent, or Firm*—Paul K. Godwin, Jr.; Clifford L. Sadler

[57] ABSTRACT

A thermal compensator assembly employed in an optical system to adjust the relative location of lens elements to maintain a preset focus as the ambient temperature changes. A serpentine channel, having several elongated channel portions parallel to the optic axis, contains a plurality of spherical elements throughout most of its length. The serpentine channel is formed on the surface of a first lens barrel, having a relatively high linear coefficient of expansion, and changes in length as the first lens barrel changes in response to ambient temperature change. The spherical elements are made of a material such as Kovar or Invar, having a relatively low linear coefficient of expansion, and therefore occupy a substantially fixed length with respect to the responsively changing length of the serpentine channel. A second lens barrel is bias mounted for movement with respect to the first lens barrel so as to abut the spherical elements within the serpentine channel.

14 Claims, 4 Drawing Figures

THERMAL COMPENSATOR ASSEMBLY

CROSS REFERENCE TO RELATED APPLICATIONS

This application is related to my U.S. patent application Ser. No. 856,699, filed Dec. 2, 1977, entitled THERMAL COMPENSATOR LINKAGE.

BACKGROUND OF THE INVENTION

1. Field of the Invention

The present invention relates to a mechanical assembly which provides linear movement in response to temperature changes. More specifically, the present invention relates to improvements in thermal compensator mechanisms as employed in optical systems.

2. Description of the Prior Art

The problem of focus distortion in optical systems due to changes in temperature has been frequently discussed in the prior art. Generally, temperature variations cause glass lenses to expand or contract and therefore vary the indices thereof. The lens mounts also tend to expand or contract due to changes in temperature and additionally affect the focal point. In order to maintain a fixed focal point throughout wide variations in temperature, many systems have been developed for compensating the above mentioned expansion and contraction.

In U.S. Pat. No. 1,325,936, compensation was achieved between two lenses by mounting each lens in separate mounting barrels and connecting the barrels at a point removed from the lenses. The two barrels were made of materials having different thermal coefficients of expansion, so that any change in temperature resulted in a separation change between the lenses corresponding to the difference between the two barrel expansions or contractions.

In U.S. Pat. No. 2,533,478, compensation was achieved by mounting the lenses in a barrel having a relatively low coefficient of expansion and connecting one end of the lens barrel to an expandable sleeve having a relatively high coefficient of expansion. The other end of the expandable sleeve was connected to an outer support sleeve having a relatively low coefficient of expansion.

In U.S. Pat. No. 2,537,900, compensation was achieved by mounting the lenses in a barrel having a relatively low coefficient of expansion and connecting one end of the lens barrel to a camera body. The camera body had a relatively high coefficient of expansion to vary the position of the focal point in compensating fashion to maintain the preset focus.

SUMMARY OF THE INVENTION

The present invention overcomes the basic size restriction problem inherent in the prior art, as well as offering an alternative to the compensator linkage disclosed and claimed in my aforementioned earlier filed application.

Large compensational adjustments are obtainable with the present invention to account for changes in the ambient temperature. A technique is employed of multiplying the length changes occuring in a first lens holding barrel and adjusting the relative distance between a lens element in a second lens holding barrel and the lenses in the first barrel by an amount equal to the product. Multiplication is achieved by forming a serpentine channel on the outer surface of the first lens barrel. The serpentine channel is made up of a plurality (multiplier) of parallel straight line portions which each extend along a predetermined length of the first lens barrel. Since the first lens barrel is constructed of a material having a relatively high linear coefficient of expansion, the predetermined length dimension L of the straight line portions of the serpentine channel will change an amount ΔL (multiplicand) in response to changes in temperature.

The series of spherical elements having a relatively low linear coefficient of expansion are disposed in the serpentine channel and compacted therein to occupy a substantially fixed length of the channel. Therefore, as the channel length changes in response to temperature changes, the spherical elements will move within the channel to occupy a substantially fixed length therein.

An outer second lens holding barrel is mounted for relative movement with respect to the first lens holding barrel and is biased against the spherical elements to cause their compaction against each other within the serpentine channel.

A first embodiment is shown that provides for relative movement of the two lens barrels in a contracting manner as temperature increases; and a second embodiment provides for relative movement of the two lens barrels in a separating manner as the temperature increases. These two embodiments are structurally differentiated by variations in both the serpentine channel configuration and biasing direction.

It is an object of the present invention to provide a lightweight thermal compensator assembly.

It is another object of the present invention to provide a compact thermal compensator assembly suitable for use in optical systems.

It is a further object of the present invention to provide a thermal compensator assembly which employs a mechanical multiplication technique to provide compensational movement of a lens element to maintain a preset focus as ambient temperature changes.

DESCRIPTION OF THE PREFERRED EMBODIMENT

Figure 1:
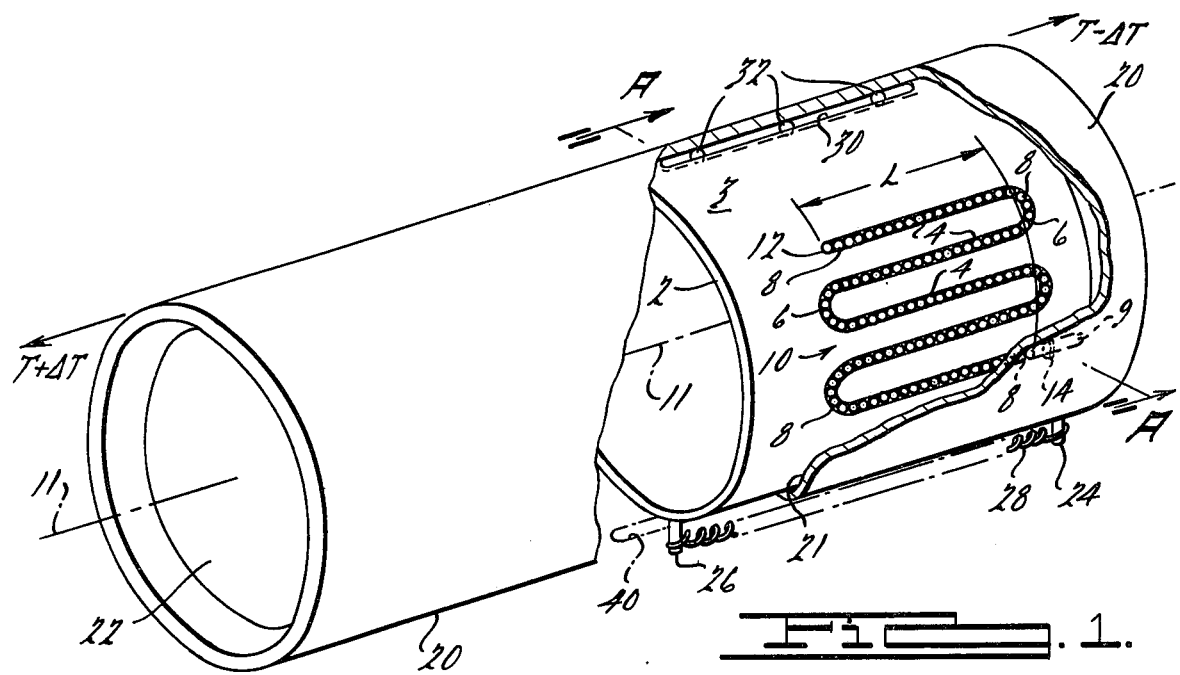
FIG. 1 is a cut-away illustration of the first embodiment of the present invention.

A first embodiment of the present invention is shown in FIG. 1, as employed in an optical lens system. In this embodiment, a first lens holding barrel 2 is shown as being concentric within an outer, relatively movable lens holding barrel 20. Generally, the first lens holding barrel 2 is rigidly mounted to a support mechanism of a telescope or other optical device (not shown).

The outer lens holding barrel 20 contains a lens element 22 and is supported for movement with respect to the first lens holding barrel 2 by a plurality of ball bearing assemblies. Each ball bearing assembly includes a groove 30 which extends linearly along the outer surface 3 of the lens barrel 2 parallel to the optical axis 11. Corresponding grooves 34 on the inner surface 21 of the outer barrel 20 provide bearing surfaces for roller bearings 32 mounted therein.

The thermal compensator assembly is indicated as 10 in FIG. 1. A corresponding thermal compensator is shown as 10' in FIG. 2 to provide balanced compensational adjustment of the outer barrel 20 with respect to the inner barrel 2.

The thermal compensator 10 (identical to 10') includes a plurality of straight line channel portions 4 which extend over a straight line length L along the outer surface 3 of the barrel 2 parallel to the optical axis 11. The plurality of n straight line channel portions 4 (n is a positive integer greater than 1), are connected with N−1 transverse channel portions 6 to form a serpentine channel which extends from a stop 12 to a stop 9. A plurality of spherical elements 8 substantially occupy the total length of the serpentine channel, with the exception of a small contraction space adjacent the stop 9. A tab 14 extending from the inner surface 21 of the outer barrel 20 contacts the last spherical element 8 adjacent the stop 9 and is biased to cause compression of the spherical elements along the serpentine channel 10 against the stop 12. Biasing is achieved by the coil spring 28 connected between a post 24 extending from the barrel 20 and a post 26 extending from the inner barrel 2. Therefore, it can be seen that the tab 14 forces the spherical elements 8 to occupy the parallel and transverse portions of the serpentine channel 10. In this instance, the barrels are biased in a manner which tends to separate the barrel 2 from the barrel 20.

The materials used for the inner barrel 2 and the spherical elements 8 have dissimilar linear coefficients of expansion. In this embodiment, the lens barrel 2 is formed of a material having a relatively high linear coefficient of expansion such as aluminum or magnesium and the spherical elements 8 having a relatively low linear coefficient of expansion such as Invar or Kovar. Assuming an upward change $\Delta T$ in ambient temperature T, (i.e., $T+\Delta T$), the length L of each parallel channel portion 4 increases by an amount $\Delta L$ as a function of temperature. During that same temperature increase, the spherical elements 8, having a relatively low linear coefficient of expansion, occupy a substantially fixed length within the serpentine channel 10. Therefore, as the length L(T) of serpentine channel 10 increases due to temperature increase, the spherical elements 8 move along the serpentine channel 10 as a result of the tab 14 being biased to compact the spherical elements 8 against the stop 12.

In the event of a decrease in ambient temperature $T-\Delta T$, the length L(T) of each parallel portion 4 of the serpentine channel 10 will decrease by an amount $\Delta L$ and cause an opposite movement of the outer barrel 20 with respect to the inner barrel 2 to that described above. Therefore, in each case the amount of linear compensation is determined by $n \times \Delta L(T)$.

It should be understood that, although only the spherical elements 8 are shown in FIG. 1, it is possible to substitute rod elements of Invar or Kovar for elements 8 in the straight parallel portions 4 of the channel 10 to complete the series effect of a non-expanding material in an expanding channel.

Figure 2:
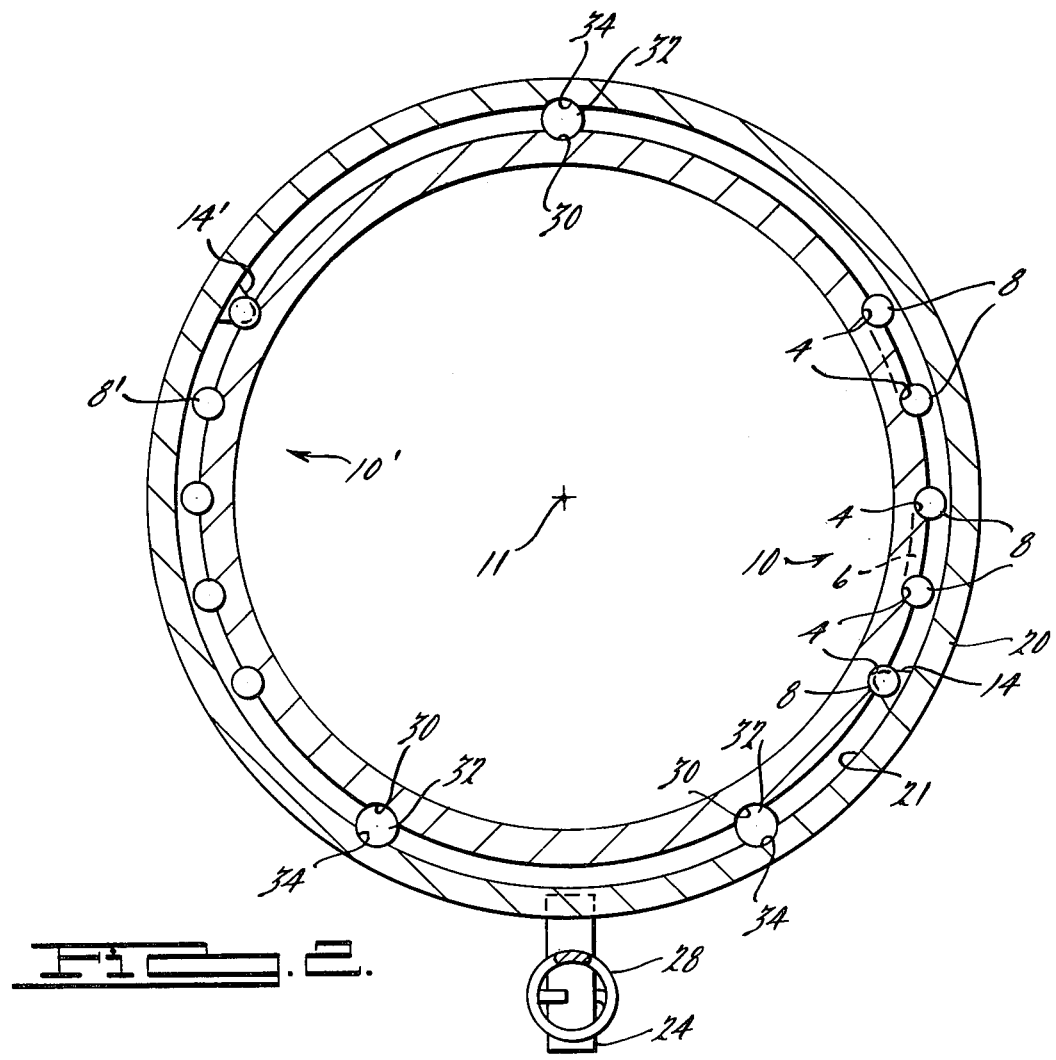
FIG. 2 is a cross-sectional view of the first embodiment shown in FIG. 1, taken along section lines A—A.
Figure 3:
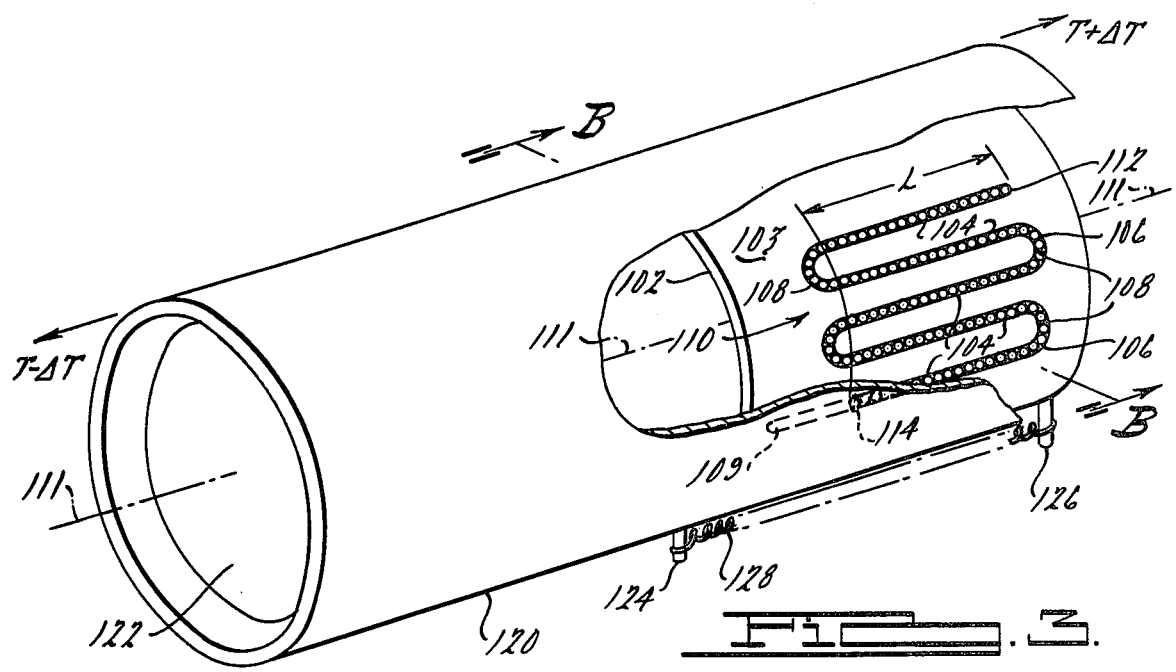
FIG. 3 is a cut-away illustration of a second embodiment of the present invention.
Figure 4:
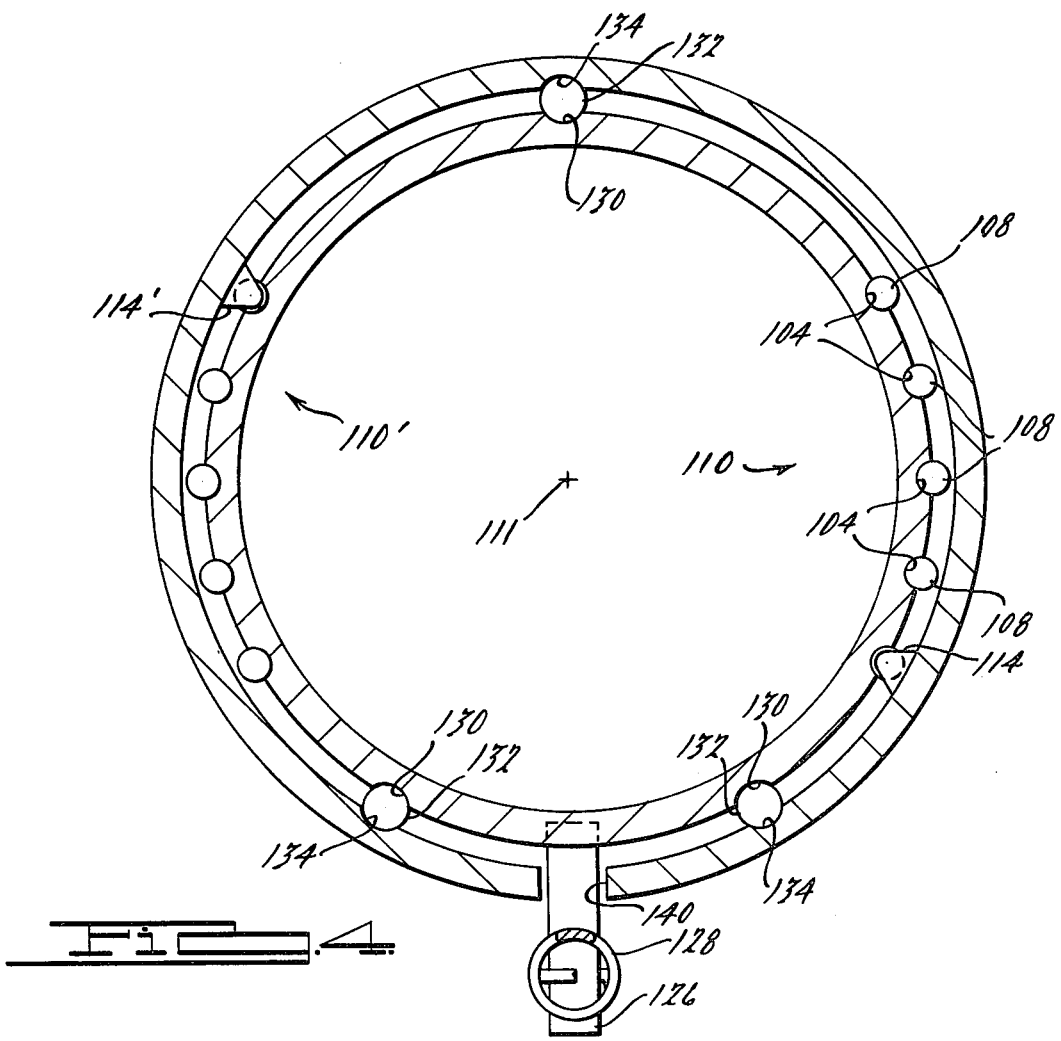
FIG. 4 is a cross-sectional view of the second embodiment shown in FIG. 3, taken along section lines B—B.

The second embodiment of the present invention is shown in FIGS. 3 and 4, wherein like elements are indicated with the same numerical characters plus 100 (e.g., element 8 shown in FIGS. 1 and 2 is element 108 in FIGS. 3 and 4). In this second embodiment, the stop 112 and the stop 109 are reversed in orientation from those shown in FIG. 1. Therefore, when the ambient temperature is increased, the second embodiment causes the lens barrels 102 and 120 to move towards each other. Correspondingly, when the temperature is reduced, the barrels 102 and 120 move in a compensating direction which separates the lens elements. Biasing is effected by coil spring 128 attached to a pole 126 extending from the inner lens barrel 102 and a post 124 extending from the outer lens barrel 120. A groove 140 is formed in the lens barrel 120 to allow the post 126 to move longitudinally therein.

In addition to the above described embodiments, it will be apparent that many modifications and variations may be effected without departing from the scope of the novel concept of this invention. Therefore, it is intended by the appended claims to cover all such modifications and variations which fall within the true spirit and scope of the invention.

I claim:

1. A thermal compensator assembly for use in an optical lens system comprising:

lens means for focusing an image at a predetermined location;

means for holding said lens means;

means for supporting said holding means, said supporting means being relatively fixed with respect to said holding means and including at least one serpentine channel defined thereon;

said thermal compensator assembly being mounted on said support means in contact with said holding means to effect relative movement between said supporting means and said holding means in response to changes in temperature; and said assembly including a series of elements occupying said at least one serpentine channel and means for biasing said holding means in contact with the last element of said series wherein said supporting means and said elements are made of materials having respectively different linear coefficients of thermal expansion and said relative movement is a result of the difference between said linear coefficients of thermal expansion as a function of a change in ambient temperature.

2. A thermal compensator assembly as in claim 1, wherein said support means has a length dimension extending parallel to the optical axis of said lens means;

said at least one serpentine channel has a plurality of straight line portions which are substantially parallel to said length dimension of said support means and at least one transverse portion which connect each adjacent pair of said straight line portions to provide a continuous serpentine channel for said elements.

3. A thermal compensator as in claim 2, wherein said biasing means is a spring having one end connected to said support means and a second end connected to said holding means.

4. A thermal compensator as in claim 2, wherein said support means comprises a first lens barrel constructed of a first material having a relatively high linear coefficient of expansion and said elements are formed of a second material having a relatively low linear coefficient of expansion.

5. A thermal compensator as in claim 4, wherein said first material is selected from the group consisting of aluminum and magnesium.

6. A thermal compensator as in claim 4, wherein said second material is selected from the group consisting of Kovar and Invar.

7. A thermal compensator as in claim 4, wherein said series of elements includes spherical shaped elements.

8. A thermal compensator assembly for effecting relative movement between a plurality of optical elements in response to changes in ambient temperature comprising:
- a first lens barrel containing a first optical element which defines an optical axis, a plurality of elongated channels on the outer surface of said first barrel extending parallel to said axis, and at least one transverse channel interconnecting the ends of a pair of said elongated channels to form a first continuous serpentine channel;
- a second lens barrel containing a second optical element along said optical axis, mounted for relative movement on said first lens barrel;
- said first lens barrel is formed of a material having a relatively high linear coefficient of expansion, whereby the length of said serpentine channel changes in response to changes in ambient temperature;
- said serpentine channel containing a plurality of serially arranged spherical elements, formed of a material having a relatively low linear coefficient of expansion, being compacted in said serpentine channel so as to occupy a relatively fixed length with respect to said changing lengths of said serpentine channel; and
- means for biasing said second lens barrel in a direction parallel to said optic axis against said spherical elements to cause said compaction of said spherical elements in said serpentine channel; and
- whereby said second optical element will move a compensating distance with respect to said first optical element to maintain a preset focus as said length of said serpentine channel responsively changes.

9. A thermal compensator assembly as in claim 8, wherein said first continuous serpentine channel comprises n said parallel elongated channels, n defined as a positive integer greater than 1, and n−1 transverse channels.

10. A thermal compensator assembly as in claim 9, further including a plurality of continuous serpentine channels, identical to said first continuous serpentine channel, separately located on said outer barrel surface.

11. A thermal compensator as in claim 8, wherein said first lens barrel material is selected from a group consisting of aluminum and magnesium.

12. A thermal compensator as in claim 8, wherein said spherical element material is selected from a group consisting of Kovar and Invar.

13. A thermal compensator as in claim 8, wherein one of said plurality of elongated channels contains a stop, against which said spherical elements within said continuous serpentine channel are compacted.

14. A thermal compensator as in claim 13, wherein said second lens barrel further includes an inwardly extending tab for contacting said spherical elements to communicate the biasing force from said biasing means to said spherical elements to effect said compaction.

* * * * *